March 18, 1930.  L. C. JANSSEN ET AL  1,751,039
SPRAYING MACHINE
Filed July 19, 1928  3 Sheets-Sheet 1

Inventors
L. C. Janssen
W. A. Janssen
By Watson E. Coleman
Attorney

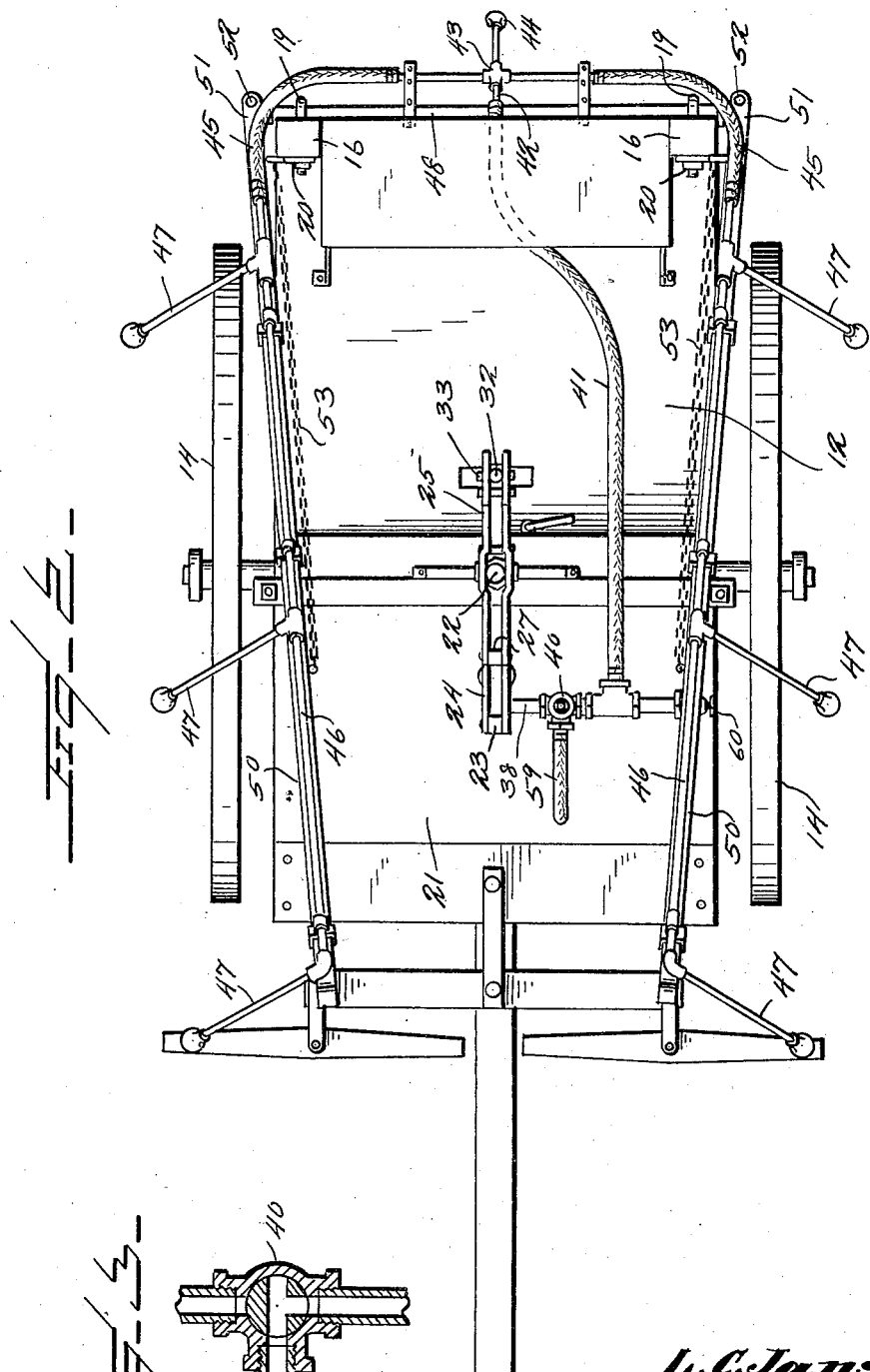

March 18, 1930.                L. C. JANSSEN ET AL                1,751,039
                                 SPRAYING MACHINE
                              Filed July 19, 1928            3 Sheets-Sheet 3

Inventors
L. C. Janssen
W. A. Janssen
By Watson E. Coleman
Attorney

Patented Mar. 18, 1930

1,751,039

UNITED STATES PATENT OFFICE

LOUIS C. JANSSEN AND WILHELM A. JANSSEN, OF LAGRANGE, TEXAS

SPRAYING MACHINE

Application filed July 19, 1928. Serial No. 293,935.

This invention relates to spraying machines and particularly to spraying machines which are driven by the traction wheels of the supporting frame upon which the spraying mechanism is mounted.

The general object of the present invention is to provide a spraying machine which is particularly adapted for spraying cotton or other crops with insecticide or fungicide and in which traction wheels of the machine furnish power for operating a pump.

Another object is to provide a mechanism of this character having spray pipes projecting laterally from the frame of the machine and supporting means for the pipes which permit the pipes to be adjusted on each side independent of the other side of the machine either up and down or rearward and forward, so that the pipes may be disposed either in a proper spraying position or raised at their ends to pass obstructions, or raised and inclined forward and upward to permit the sprayer to pass through narrow gates or openings and when traveling over roads.

Another object is to so mount the spray pipes that they may readily be adjusted up or down to any desired height.

Other objects will appear during the course of the following description.

Our invention is illustrated in the accompanying drawings wherein—

Fig. 2 is a top plan view thereof;

Fig. 3 is a sectional view of the valve;

Fig. 4 is a fragmentary front elevation showing the supports for the spray pipes;

Fig. 5 is a section on the line 5—5 of Fig. 4;

Fig. 6 is a sectional view through the tank and pump; and

Fig. 7 is a plan view of the driving gear for the pump.

Figure 1:
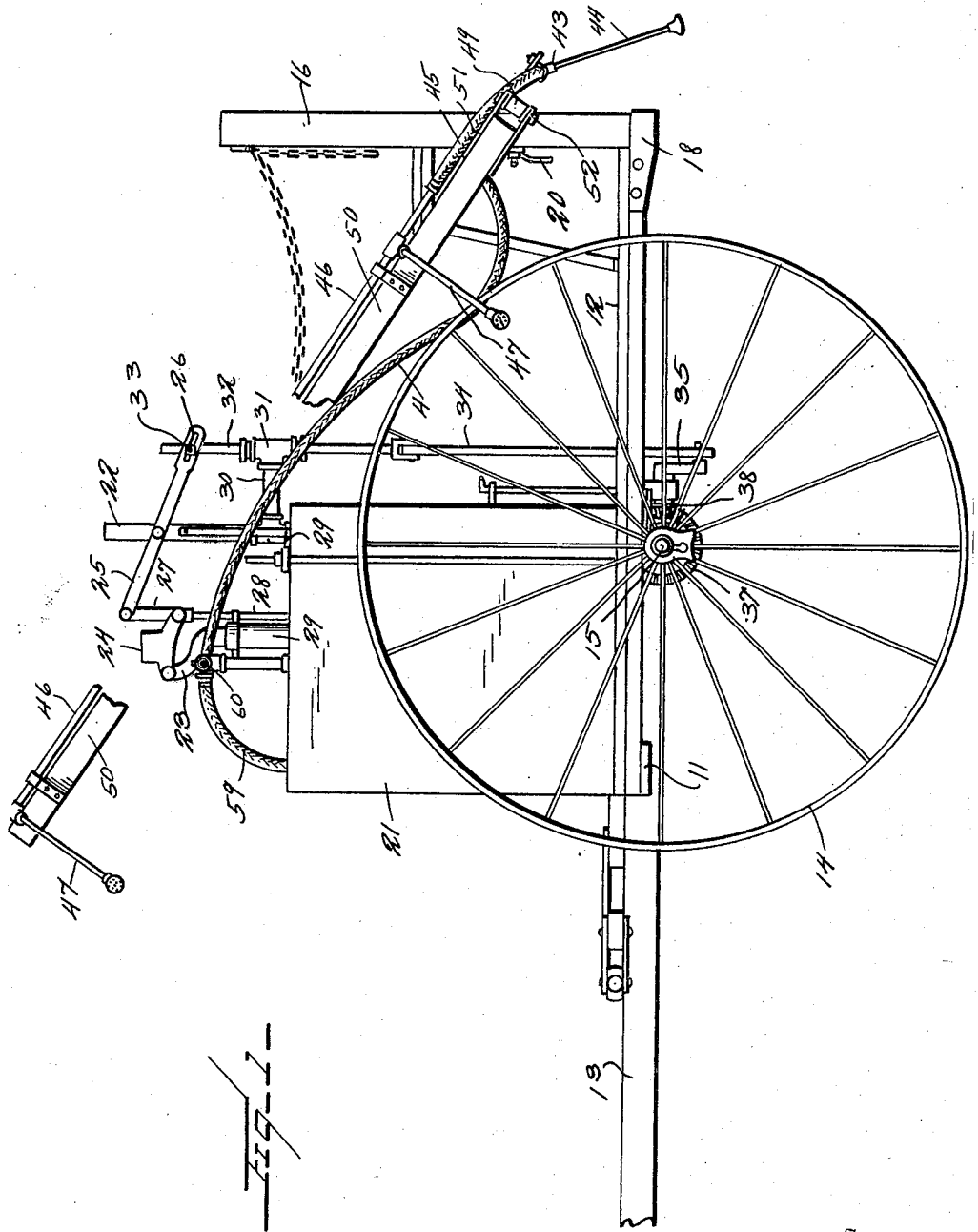
Figure 1 is a side elevation of a spraying machine constructed in accordance with my invention.

Referring to these drawings, 10 designates the longitudinal beams of a supporting frame, these beams being connected by transverse beams 11 and by a transversely extending platform 12.

At the forward end of the frame is attached the tongue 13 and suitable draft appliance. The frame is supported upon the wheels 14 which may be of any desired height or character and which are mounted upon an axle 15.

Extending upward from the rear end of the frame are the two oppositely disposed posts 16 which are vertically slotted at 17; these posts being connected to the beams 10 by means of the straps 18. Operating in the slots 17 are the eye-bolts 19 having the wing nuts 20, whereby the eye-bolts may be champed at any vertically adjusted position upon the posts 16. Mounted upon the platform 12 adjacent the forward end of the platform is a tank 21 designed to contain insecticide or fungicide. Extending upward from the tank at its rear end is a supporting post 22 and adjacent the forward end of the tank there is an upwardly extending bracket 23 pivotally supporting a link 24. Pivotally mounted upon the post 22 is a rocker 25 which is longitudinally slotted at its rear end at 26. This rocker is preferably formed of two metallic bars bolted to each other at the ends, one of said bolts passing through a link 27 which is pivotally connected to the link 24 and to the pump rod 28 which extends down into the tank 21. The post 22, which is made of pipe, is engaged with a T 29 having an outwardly extending pipe section 30 connected to a vertically disposed T 31 having therein a sleeve, and operating in this bearing sleeve is a reciprocating member 32, which at its upper end is connected by a bolt 33 to a rocker 25, this bolt passing through slots 26.

The lower end of the member 32 is forked and pivotally connected to a connecting rod 34 which in turn is connected to a crank arm 35 mounted upon a shaft 36 which is connected to the traction wheels 14, as will be later stated.

The piston rod 28 extends downward through suitable guides formed upon the bracket 23 and into the pump barrel 37 which is connected to the lower end of upwardly extending pipe 38 having a strainer at its lower end, which pipe extends upward through the top of the tank. Mounted upon this pipe 38 is an agitator 39 of ordinary form having operative connection with the pump rod 28 and oscillated by the reciprocations of said pump rod.

We have not illustrated the interior of the pump nor the valve system as any form of spray pump may be used by us and the form which we have illustrated generally is one commonly found on the market.

The upper end of the pipe 38 is connected by means of a three-way valve 40 to a flexible hose 41 which extends rearward and is detachably connected by a nipple 42 to a four-way coupling 43 from one branch of which projects the spray pipe 44 and from the opposite branches extend the laterally flexible hose sections 45; these in turn being connected to the laterally extending pipes 46 which carry upon them spray heads or spray branches 47. The spray heads 44 and the spray heads 47 are all provided with suitable nozzles for projecting a very fine spray downward and rearward upon the plants being treated.

For the purpose of supporting the spray pipes we provide a transversely extending pipe section 48 which extends through the eye-bolts 19. This pipe section carries at its ends the T 49. Disposed beneath the pipes 46 are the wooden supporting arms 50, each provided at its butt with the two outwardly projecting straps 51 and a pivot bolt 52 passes through these straps and through the T 49 thus swingingly engaging the arms 50 with the extremities of the supporting pipe 48.

With this construction the pipe 48 may be rotated within the eye-bolts provided the nuts 20 are loosened or the T 49 may be rotated upon the pipe section 48 and in either case the pivotal axes of the arms 50 will be rotated and thus these arms are adjustable so as to swing forward and rearward or upward and downward or in planes between these planes and inasmuch as the pipe sections 46 carried upon these arms are connected to the four-way coupling 43 by flexible pipes 45, these lateral pipe sections may be adjusted to any desired position and particularly may be shifted into parallel relation to the sides of the tank or may be shifted forward and upward, in which position the sprayer may readily be passed through gates, through barn doors, or may travel upon the road. These pipe sections may also be elevated so as to escape crops, or just one of the arms 50 or its corresponding pipe section 46 may be raised or lowered or otherwise adjusted.

By releasing the nuts 20 the spray pipes may be raised or lowered bringing them to the desired height and this is permitted by the flexible hose 41. In order to support the arms 50, chains 53 are provided, each attached to one of the arms 50 and any desired links of these chains may be connected to the hooks 54 which are mounted upon posts 16.

The connecting rod 34 extends down to a crank 35 mounted upon a shaft 36. The axle carries upon it the bevel gear wheel 57 which engages the beveled pinion 58 mounted upon the shaft 36. Preferably the wheels 14 will be loosely mounted upon the axle 15, there being an ordinary clutch connection between the wheels and the axle which will cause the axle to rotate upon a forward movement of the machine, but will permit the wheels to rotate independently of the axle upon a rearward movement of the machine so as to permit the machine to be backed if necessary.

The three-way valve is connected to a return pipe 59 whereby the pump may return the liquid discharged from the pump back into the tank, this being particularly desirable initially when the ingredients of the spray are being mixed and before actual spraying takes place, thus the ingredients may be placed in the tank and the sprayer moved where it is desired for use and when the sprayer reaches this point the ingredients will be thoroughly mixed and be ready for spraying. Of course the three-way valve may be closed in order to cut off discharge from the pump to the spray pipes.

We do not wish to be limited to any particular pumping means or spray head or anything of this nature as these details may be varied in many ways without departing from the spirit of the invention. Other details of construction may be varied within the spirit of our invention.

This machine is particularly designed for spraying cotton and other crops of like nature and is designed in this particular instance for spraying seven rows at a time, as the spraying cart is moved along by the team, the wheels straddling one row.

A clutch is provided between the axle and the bevel gear wheel 57 so as to cut off the operation of the pump. Any usual form of clutch may be used. Obviously the spray pipes may be directed downwardly at any desired angle or may be directed straight rearward, and as before remarked, they may be adjusted to any desired height, thus making this sprayer particularly convenient and effective.

The sprayer pipe supporting arms may be adjusted through a range of about thirty inches and in case of an obstruction, either or both of the arms may be raised.

A relief valve 60 is provided at the end of the pipe 38 as is usual in devices of this character.

What we claim is—

1. A spraying machine including a wheeled supporting frame, a tank thereon, a pump carried by the tank, means actuated by the wheels for operating the pump, a vertically movable supporting member operatively mounted upon the supporting frame and adjustable to different heights, said member being also mounted for rotation about its longitudinal axis, supporting arms flexibly engaged with said supporting member whereby the arms may be swung in a plurality of planes into parallel relation with the tank or swung outward or upward, spray pipes upon said arms and upon said member, and a flexible hose connecting said spray pipes to the pump.

2. A spraying machine including a wheeled supporting frame, a platform thereon, upwardly extending vertically slotted posts on the platform, eye-bolts extending through the posts, a transverse supporting member having its ends projecting through the eye-bolts and being thereby vertically adjustable upon the posts, rotatively adjustable members mounted upon the ends of the supporting member, arms pivotally engaged with the rotatively adjustable members whereby said arms may be swung to a plurality of different positions and in a plurality of different planes, spray pipes carried by said member and the arms and having spraying nozzles, a tank mounted on the platform, a pump coacting therewith, means for operating the pump from the wheels of the machine, and a flexible pipe connecting the pump to the spray pipes.

3. In a spraying machine, a wheeled supporting frame, upwardly extending posts, a supporting member mounted upon said posts for vertical adjustment, arms mounted upon the supporting member for rotation around the longitudinal axis of said supporting member and for angular adjustment relative to the supporting member, means for supporting the arms in angularly adjusted positions, pipe sections mounted upon the arms and having spraying nozzles, a medially disposed pipe section mounted upon said supporting member, flexible pipes connecting the pipe sections on the arms to the medial pipe section, a tank, a pump, and a flexible pipe connection from the pump to said medial pipe section.

4. A sprayer of the character described comprising a wheeled supporting frame, vertically slotted posts mounted on the frame, eye-bolts extending through the slots, a transversely extending supporting member having its ends extending through the eye-bolts and being thereby vertically adjustable on the posts, T's connected to said member, arms having portions overlapping the ends of the T's, pintle bolts extending through said portions and through the T's, the T's being axially adjustable and the arms being swingable upon the bolts, flexibly connected spray pipes mounted upon the arms, and upon said member and having spraying nozzles, a tank carried by the frame, and a wheel actuated pumping means for discharging liquid from the tank to said spraying pipes.

In testimony whereof we hereunto affix our signatures.

LOUIS C. JANSSEN.
WILHELM A. JANSSEN.